April 8, 1969 T. M. LO CASALE 3,437,830

TWO PHASE PARAMETRON SYSTEM

Filed June 4, 1965 Sheet 1 of 2

INVENTOR
THOMAS MICHAEL LO CASALE

BY [signature]

ATTORNEY 3,437,830
Patented Apr. 8, 1969

3,437,830

TWO PHASE PARAMETRON SYSTEM

Thomas Michael Lo Casale, Warminster, Pa., assignor to Sperry Rand Corporation, New York, N.Y., a corporation of Delaware Filed June 4, 1965, Ser. No. 461,261
Int. Cl. H03f *21/00*
U.S. Cl. 307—88 18 Claims

ABSTRACT OF THE DISCLOSURE

A cascaded parametron amplifier system is described wherein each alternate stage of the cascade is intercoupled to the next stage of the cascade through a respective phase shift network providing a phase shift of one sense and each intermediate stage of the cascade is intercoupled to the next stage of the cascade through a phase shift network providing a phase shift of the opposite sense; and wherein the pump signal applied to the alternate stages of the cascade is phase shifted relative to the pump signal applied to the intermediate stage of the cascade.

This invention relates to an improvement in electric digital computing devices utilizing parametrically excited resonators and, more particularly, to an improvement in means for coupling said resonators.

An oscillation can be produced in a resonance circuit by varying the resonance frequency of said resonance circuit abruptly with an exciting or "pump" wave having a frequency about twice that of the resonance frequency of said resonance circuit. This phenomenon is called "parametric excitation of oscillation," and such resonance circuit is called a "parametrically excited resonator." Hereafter, the parametrically excited resonators will be called "parametrons." The oscillation phase of a parametron can be either one of two stable phases which are different by 180°, for example: 0 radian and $\pi$ radian (or: $\pi/4$ radian and $5\pi/4$ radian). The pair of stable oscillation phases of the parametron are determined by the phase of the exciting wave. Accordingly, when a weak alternating current, having a frequency equal to the oscillation frequency of the parametron, is applied to the resonance circuit of the parametron at the same time as or slightly prior to the application of the exciting alternating current wave, the oscillation phase of said parametron is controlled to either one of 0 radian or one of $\pi$ radian according to the phase of said weak alternating current.

In the past, parametron circuitry utilized a three phase clock, that is, sequential parametron stages had applied, thereunto, a clocked pump source which provided an exciting wave of twice the frequency of the resonance circuit in such a manner that the pump source initially applies alternating current to the first stage; subsequently, the pump source applies alternating current to the second stage so that both the first and second stages receive pump current. Subsequently, the pump current for the first stage terminates so that pump current is applied only to the second stage. Thereafter, the pump current is applied to the third stage, followed by removal of the pump current from the second stage, thereby ensuring unidirectional flow of logic information from the first, to the second, to third stage.

The prior art of parametrons required a three phase parametron system, as described above, thereby necessitating relatively expensive clocking circuitry. Also, circulating registers were relatively large, requiring multiples of three stages.

Therefore, it is an object of this invention to provide a novel two stage parametron system.

It is still another object of this invention to provide a novel means for coupling parametrons together.

Yet another object of this invention is to provide a novel means for capacitively coupling succeeding parametron stages together.

It is yet another object of this invention to provide novel electric digital computing devices.

In accordance with one embodiment of this invention, a two phase parametron system is provided wherein alternate parametron stages (1, 3, 5 . . . ) are excited by a pump current $\phi 1$ having a fixed reference phase during clocked intervals. The remaining parametron stages (2, 4, 6 . . . ) are excited by a clocked pump current $\phi 2$ (during the remaining time intervals and overlapping with the clocked pump current of $\phi 1$) which pump current $\phi 2$ differs in phase from the reference phase of current $\phi 1$ by 90°. Thus, the odd stages 1, 3, 5 . . . parametrically oscillate at either 0 phase or $\pi$ phase, depending upon the digital signal information provided thereto. The even stages 2, 4, 6 . . . oscillate at either $\pi/4$ phase or $5\pi/4$ phase depending upon the digital signal information coupled thereto. Thus, there is a first set of parametrons which are adapted to oscillate in a bistable manner either at 0 phase or $\pi$ phase; there is a second set of parametrons which are adapted to oscillate in the bistable manner either at $\pi/4$ phase or $5\pi/4$ phase. The parametrons of the first set are coupled to the parametrons of the second set through a resistance inductance coupling so that there is a lag of $\pi/4$ radians at the resonance frequency of the parametron. The inductive reactance equals the resistive value of the coupling. The parametrons of the second set are coupled to the succeeding parametrons of the first set through a capacitive-resistive coupling, which provides a phase lead of $\pi/4$ radians, that is, the capacitive reactance is equal to the resistance value of the coupling. Thus, information flow is unidirectional from one stage to a succeeding stage.

Other objects and advantages of this invention, together with its construction and mode of operation, will become more apparent from the following description, when read in conjunction with the accompanying drawings, in which like reference symbols refer to like components and parts, and in which FIG. 1 is a diagram of one embodiment of this invention;

Figure 1:
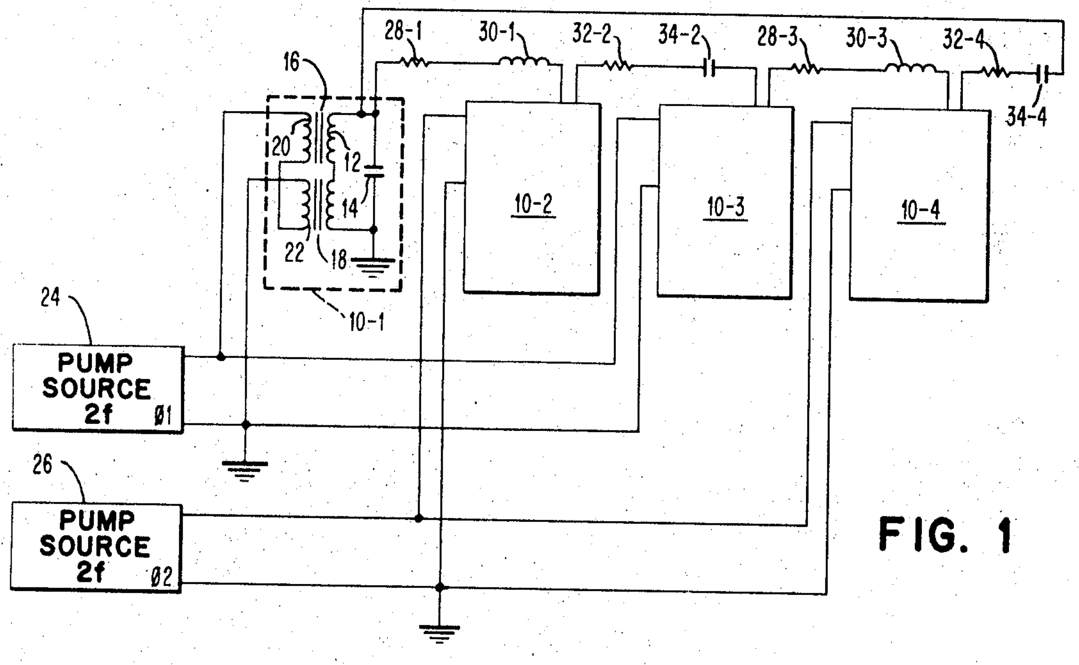

Referring to FIG. 1, there is illustrated a plurality of parametrons 10–1, 10–2, 10–3, 10–4. Each of the parametrons 10–1, 10–2, 10–3, 10–4 includes an inductance 12 and a capacitance 14. The inductance 12 and the capacitor 14 are tuned to be resonant at a frequency $f$. The resonant frequency of the tuned circuit 12, 14 is periodically varied, by a suitable means, at the frequency $2f$. For example, as illustrated in FIG. 1, the inductance 12 includes a pair of coils serially coupled in an aiding relationship as secondary windings of transformers 16, 18, respectively, having their primary windings 20, 22 coupled together in a series opposing relationship. The parametrons, illustrated in outlined blocks 10–1, 10–2, 10–3, 10–4 are parametrons such as those well known in the art.

The primary windings 20 and 22 of parametrons 10–1 and 10–3 are coupled to a pump source 24 which provides an alternating current at a frequency $2f$ having a fixed reference phase $\phi 1$. Depending upon the characteristics of the parametron, a suitable bias source may be applied thereto.

In a similar manner, the primary windings 20, 22 of parametrons 10–2 and 10–4 are coupled to a pump source 26 having an alternating current at the frequency $2f$ at a reference phase $\phi 2$. The pump sources 24 and 26, providing alternating current at the frequency $2f$, at phase $\phi 1$ and phase $\phi 2$, respectively, are reciprocally clocked at, for example, a 60–40/60–40 duty cycle.

Figure 4:
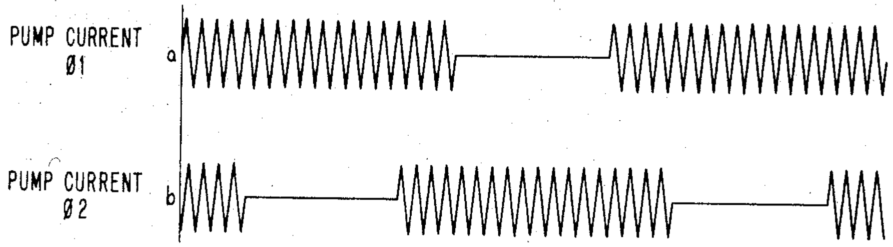
FIG. 4 is a set of waveforms illustrating the clocked pump current suitable for use in the embodiments illustrated schematically in FIGS. 1, 2, and 3.

The pump source 24 which provides the alternating current at the frequency $2f$ at the phase $\phi 1$, is illustrated schematically as waveform *a*, FIG. 4. It is noted that pump current $\phi 1$ oscillates at the frequency $2f$ at approximately 60%–40% duty cycle. The pump source 26 provides an alternating current at the frequency $2f$ at a reference phase $\phi 2$ as illustrated by waveform *b* of FIG. 4. The pump current $\phi 2$, likewise, has a 60%–40% duty cycle and is staggered in such a manner as to interlace and overlap with the pump current $\phi 1$. In the overlapping duration of the pump currents $\phi 1$ and $\phi 2$, the pump current $\phi 2$ lags the pump current $\phi 1$ by $\pi/2$ radians at the frequency $2f$.

Parametron 10–1 is coupled to the parametron 10–2 by a serially connected resistor 28–1 and inductor 30–1; the parametron 10–3, in similar manner, is coupled to the parametron 10–4 by a serially connected resistor 28–3 and inductor 30–3. The reactance of the inductor 30 is equal the resistance of the corresponding resistor 28 so that the current flowing through the serially connected resistor-inductor 28, 30 lags the voltage across the previous parametron by 45°.

The parametron 10–2 is coupled to the parametron 10–3 by a serially connected resistor 32–2 and capacitor 34–2. In a similar manner, the parametron 10–4 can be coupled to a succeeding stage by means of a serially connected resistor 32–4 and a capacitor 34–4. As illustrated, by way of example, the parametron 10–4 is coupled to the parametron 10–1 to form a recirculating shift register. However, as is well known to those skilled in the art, other subsequent stages can be used. The capacitor 34 has a capacitive reactance equal to the resistance of the resistor 32 so that the current flowing therethrough leads the voltage of the preceding parametron stage by 45°.

Figure 5:
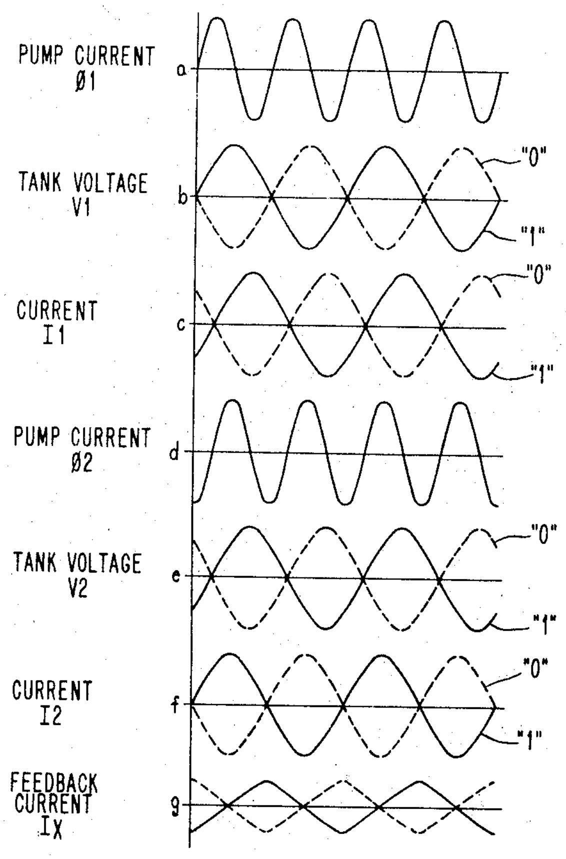
FIG. 5 is a set of waveforms, each waveform having the same time base, suitable for illustrating various electrical characteristics as applied to the embodiments illustrated in FIGS. 1, 2, and 3.

Referring to FIG. 5, there is illustrated a set of waveforms to enable one to better understand the operation of the invention. In particular, waveform *a* illustrates a sinusoidal pump current $\phi 1$ at the frequency $2f$ which is applied from the pump source 24 to the parametrons 10–1 and 10–3. The application of the pump current $\phi 1$ causes the tank voltage $V_1$ across the parametron 10–1 to oscillate at the frequency $f$ at either 0 phase or $\pi$ phase. As illustrated, for example, the signal at 0 phase represents a binary "1" while that at the $\pi$ phase represents a binary "0" (alternatively, if desired, the opposite connotation can be used).

The voltage across the parametron 10–1, as illustrated at waveform *b* (FIG. 5) causes current to flow through the serially connected resistor 28–1 and inductor 30–1, which current, as illustrated in waveform *c*, lags the voltage. Thus, the current flows at $\pi/4$ phase, representing a "1," and at $5\pi/4$ phase, representing a "0," thereby respectively lagging the voltage illustrated in waveform *b* (FIG. 5). The current, illustrated in waveform *c*, flows through the resistor 28–1 and inductor 30–1 and is applied to the following parametron 10–2. Upon excitation of the parametron 10–2 by the pump current from the source 26 (which provides alternating current at $\phi 2$ as illustrated in waveform *d*, FIG. 5), the parametron 10–2 is caused to "lock" into one of two stable phases, the proper phase being in phase with the current $I_1$ illustrated in waveform *c*, FIG. 5. Thus, as illustrated in waveform *e* (FIG. 5) the voltage $V_2$ across the parametron 10–2 is in phase with the current $I_1$ illustrated in waveform *c*, FIG. 5.

The tank voltage $V_2$ (that is, the voltage across the parametron 10–2) is at $\pi/4$ phase or at $5\pi/4$ phase for a "1" and a "0" respectively. The tank voltage across the parametron 10–2 causes current to flow through the resistor 32–2 and capacitor 34–2, which current leads the voltage. Hence, as illustrated in waveform *f*, FIG. 5, the current flow $I_2$ through the serially connected resistor-capacitor 32–2 and 34–2 leads the tank voltage $V_2$ (waveform *e*, FIG. 5). Thus, as illustrated in waveform *f* (FIG. 5), a "1" is represented by the waveform at 0 phase and a "0" is represented by the waveform at $\pi$ phase. Thus, the current $I_2$ (waveform *f*, FIG. 5) flowing through the serially connected resistor 32–2 and capacitor 34–2 causes the subsequent parametron 10–3 to have a tank voltage $V_3$, equal to the voltage $V_1$, having the phase relationship as illustrated in waveform *b* (FIG. 5), and so on.

Information flow has a forward unidirectional relationship. Feed back current $I_x$ which may tend to reverse flow is attenuated. This attenuation takes the form of an improper phase relationship. Thus, the forward current $I_1$ from the parametron 10–1 to the parametron 10–2, via the resistance 28–1 and inductor 30–1, lags the tank voltage $V_1$ by 45°; any feedback current $I_x$ from the parametron 10–2 to the parametron 10–1, via the inductor 30–1 and resistor 28–1, is delayed an additional 45°; hence, the feedback current $I_x$ totally lags the voltage $V_1$ by 90°. Therefore, the feedback current $I_x$, illustrated in waveform *g* (FIG. 5) is at the improper phase relationship for amplification.

Basic parametron theory requires that a parametric amplifier amplify those signals which bear a definite phase relationship to pump current. This effect results from the principle of constant flux linkages, i.e., the flux linkages in a circuit do not change instantaneously. Therefore, $Li=N\phi=$constant. Thus, if L is decreased instantaneously, $i$ must increase and vice-versa. Therefore to obtain current amplification L should be decreased at maximum current and returned to maximum at $i=0$. The necessary phase condition can be seen clearly from a mathematical viewpoint as follows: Let the inductance L of the resonant circuit be varied as $$L=L_0+\Delta L \sin 2\omega t$$

and assume that the presence of a sinusoidal AC current $I_f$ in the resonant circuit at frequency $f$ is considered as two components as follows:

$$I_f=I_s \sin \omega t+I_c \cos \omega t$$

Then, assuming that the rate of the variaion of amplitudes of the sine and cosine components $I_s$ and $I_c$ are small compared with $\omega$, the induced voltage V is given by:

$$V=\frac{d(LI_f)}{dt}=\omega L_0(I_s \cos \omega t-I_c \sin \omega t)+\frac{3}{2}\Delta L\omega(I_s \sin 3\omega t+I_c \cos 3\omega t)+\frac{1}{2}\Delta L\omega(-I_s \sin \omega t+I_c \cos \omega t)$$

The first term, above, illustrates that the voltage is due to a constant inductance $L_0$. The second (third harmonic) term may be neglected since it is off resonance. The third term, it should be noted, explains that the variable part of the inductance behaves like a negative resistance, $R=-\frac{1}{2}\Delta L\omega$, for the sine component $I_s$, but behaves like a positive resistance, $R=+\frac{1}{2}\Delta L\omega$ for the cosine component $I_c$. Therefore, provided that the resonant circuit is tuned to the frequency $f$, the sine component $I_s$ of any small oscillation builds up exponentially, while its cosine component damps out rapidly.

When the desired input information is designed to bear the proper phase relationship for amplification and the feedback signals from driven stages are constrained to bear the improper (90°) phase relation, then only the input information can be amplified. This type of operation is achieved as follows.

Referring to the drawings:

The resistance of the tank should be much lower than the resistance of the coupling resistors 28 and 32. If not, the resistance of the coupling resistors 28 and 32 are each adjusted to include the effect of the resistance of the tank.

The inductive reactance $|X_l|$ should equal the capacitor reactance $|X_c|$ which should equal the resistance R.

The current $I_1$ lags $V_1$ by 45°.

The pump current at the phase $\phi 2$ is set at a 45° tank lag (90° of the pump) to that of phase $\phi 1$, whereby $I_1$ and $I_{pump}$ $\phi 2$ are in the proper phase relation for amplification.

Any undesired feedback from one parametron to a previous parametron is shifted an additional 45° lag; therefore, the final phase of the unwanted feedback current $I_x$ is $$I_x=\frac{V}{|Z|}\underline{/-45°}\,\underline{/-45°}=\frac{V_1}{|Z|}\underline{/-90°}$$

and, from the above description, it is noted that a 90° phase shift is not amplified; the feedback current acts like the cosine component $I_c$ described previously and is attenuated.

To couple from a parametron at phase $\phi 2$ to a parametron at phase $\phi 1$ to continue information propagation, an RC circuit is used to achieve a 45° phase lead. Thus, $$I_2=\frac{V_1}{|Z|}\underline{/-45°}\,\underline{/+45°}=\frac{V_1}{|Z|}\underline{/0°}$$

whereby $V_1$ and $I_2$ are in phase for proper parametric amplification.

The embodiment illustrated in FIG. 1 illustrates, systematically, one embodiment of the invention showing an unbalanced coupling.

Figure 2:
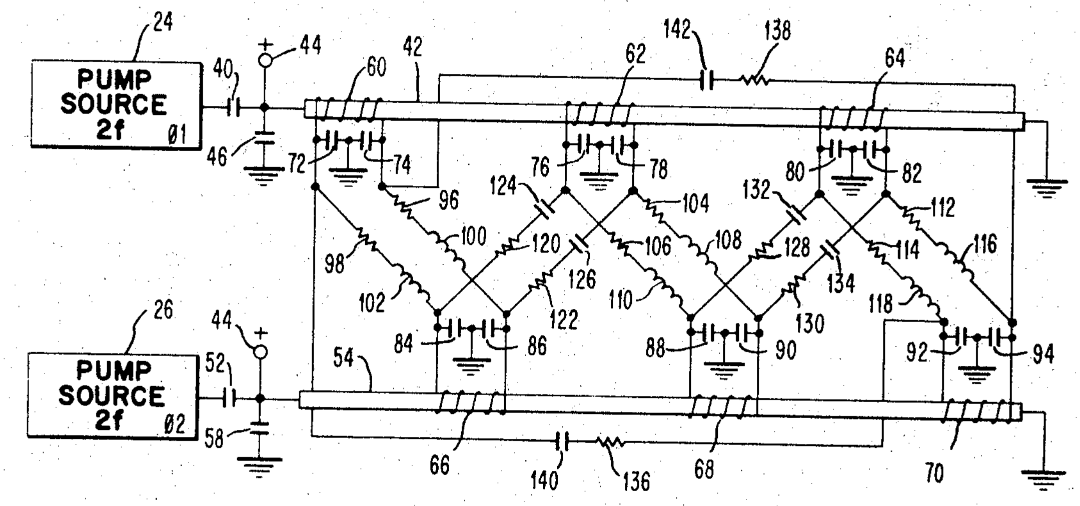
FIG. 2 is a diagram of another embodiment of this invention.

FIG. 2 illustrates a balanced coupling technique utilizing plated magnetic wire. Thus, as illustrated in FIG. 2, a pump source 24 at the frequency $2f$ at a phase $\phi 1$ is coupled by a capacitor 40 to a plated magnetic wire 42. The plated wire 42 at the junction of the capacitor 40 is coupled to a DC bias source 44 by suitable means and is coupled by another capacitor 46 to ground so that the inductance of the plated wire 42 and the capacitor 46 are such as to place the same in a tuned relationship so that it appears to be a resistive load to the pump source 24. Such a resistive load is desirable; however, it is not necessary for an operation or understanding of this invention. In a similar manner, the pump source 26, which provides a clocked pump current at the frequency $2f$ at the phase $\phi 2$, is coupled by a capacitor 52 to a plated wire 54 which is coupled to a DC source 44 and to ground via a tuning capacitor 58.

A plurality of parametrons are coupled to the plated wires 42, 54. Separate coils 60, 62, 64 are wound about the plated wire 42. Similarly, separate coils 66, 68, 70 are wound about the plated wire 54. A pair of serially connected, center tapped to ground capacitors 72, 74 are coupled across the coil 60 to form a tuned circuit 60, 72, 74 which is resonant at the frequency $f$. In a similar manner, a pair of serially connected, center tapped to ground capacitors 76, 78 are coupled across the coil 62. A pair of serially connected, center tapped to ground capacitors 80, 82 are coupled across the coil 64. Similarly, a pair of serially connected, center tapped to ground capacitors 84, 86 are coupled across the coil 66; a pair of serially connected, center tapped to ground capacitors 88, 90 are coupled across the coil 68; and a pair of serially connected, center tapped to ground capacitors 92, 94 are coupled across the coil 70. The tuned circuit 60, 72, 74 wound about the plated wire 42 is coupled to a subsequent stage 66, 84, 86 wound about the plated wire 54 by serially connected balanced resistors 96, 98 and inductors 100, 102. Likewise, the tuned circuit 62, 76, 78 coupled about the plated wire 42, is coupled to the succeeding stage 68, 88, 90 wound about the wire 54 by serially connected balanced resistors 104, 106 and inductors 108, 110. Similarly, the tank circuit 64, 80, 82 coupled about the plated wire 42, is coupled to the tank circuit 70, 92, 94 wound about the plated wire 54 by serially connected balanced resistors 112, 114 and inductors 116, 118.

The signals from the various stages represented by the tank circuits wound about the plated wire 54 are coupled to the respective succeeding stages represented by the tank circuits wound about the plated wire 42 by serially coupled resistors and capacitors.

Thus, the tuned circuit 66, 84, 86 is coupled to the succeeding tuned circuit 62, 76, 78 by means of balanced serially connected resistors 120, 122 and capacitors 124, 126. Likewise, the tuned circuit 68, 88, 90 are coupled to the tuned circuit 64, 80, 82 by balanced serially connected resistors 128, 130 and capacitors 132, 134; and in a similar manner as described heretofore in connection with FIG. 1, a recirculating shift register can be created by coupling the tuned circuit 70, 92, 94 to the tuned circuit 60, 72, 74 by means of balanced serially connected resistors 136, 138 and capacitors 140, 142.

The plated wire parametron recirculating shift register, as illustrated in FIG. 2, operates in a similar manner to the parametron recirculating shift register illustrated in FIG. 1.

Figure 3:
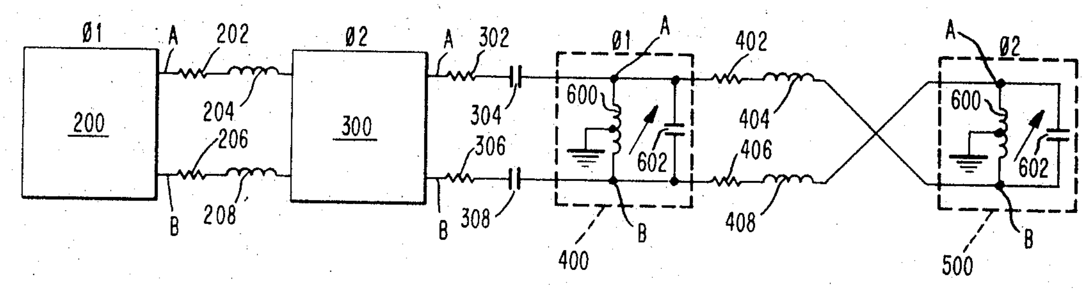
FIG. 3 is an electrical diagram illustrating yet still another embodiment of this invention.

FIG. 3 illustrates, schematically, parametrons 200, 300, 400, 500. Each of the parametrons 200, 300, 400, 500 has an inductor 600 which is center tapped to ground or other point of reference potential. A capacitor 602 is coupled, respectively, across its corresponding inductor 600. The inductive reactance of each of the alternate parametrons 200, 400 is varied in a clocked manner at a frequency $2f$ at a reference phase $\phi 1$, as illustrated, for example, by waveform $a$ (FIG. 4). Likewise, the remaining parametrons 300, 500 have their inductances varied at the clocked frequency $2f$, having a reference phase $\phi 2$ as illustrated by waveform $b$ (FIG. 4), wherein the phase relationship of waveforms $a$ and $b$ is such that waveform $b$ lags the waveform $a$ by 90° at the pump frequency (45° at the tank frequency).

The top terminal A of the parametron 200 is serially coupled to the top terminal A of the parametron 300 by a serially connected resistor 202 and inductor 204. The bottom terminal B of the parametron 200 is serially connected to the bottom terminal B of the parametron 300 by a serially connected resistor 206 and inductor 208.

The top terminal A of the parametron 300 is serially connected to the top terminal A of the parametron 400 by a serially connected resistor 302 and capacitor 304; the bottom terminal B of the parametron 300 and the bottom terminal B of the parametron 400 are serially connected together by a resistor 306 and capacitor 308.

However, the top terminal A of the parametron 400 is serially connected together to the bottom terminal B of the parametron 500 by a serially connected resistor 402 and inductor 404, while the bottom terminal B of the parametron 400 is serially coupled to the top terminal A of the parametron 500 by a serially connected resistor 406 and inductor 408. Thus, in effect, the coupling to the parametron 500 causes the parametron 500 to oscillate as an inverter; that is, since the stage, in effect, has been turned upside down so that the signal across the terminals AB of the parametron 400 is now applied to the terminals BA of the parametron 500, the parametron 500 oscillates at a phase representative of a "1" when a "0" is transferred, and at a phase representative of a "0" when a "1" is transferred. Hence, a parametron inverter has been described and is illustrated in FIG. 3.

Since parametrons are coupled together by different impedance means, including inductances and capacitors, modern miniaturization techniques may be employed. For example, thin films can be deposited to form capacitors for joining various parametrons together.

Other modifications will be suggested to those skilled in the art in view of the teachings of this invention. It is desired that this invention be broadly constructed and that it be limited solely by the scope of the allowed claims.

The embodiments of the invention in which an exclusive property or privilege is claimed are defined as follows:

1. In combination, a first parametron, a second parametron, and a third parametron, each of said parametrons being tuned to resonate at a frequency $f$, first resistive-reactive phase shift means providing a signal phase shift in one sense coupling said first and second parametrons together, and second resistive-reactive phase shift means providing a signal phase shift in an opposite sense coupling said second and third parametrons together.

2. The combination as claimed in claim 1 wherein said first resistive-reactive phase shift means is a resistive-inductive means, and wherein said second resistive-reactive phase shift means is a resistive-capacitive means.

3. The combination as claimed in claim 1 wherein said first resistive-reactive phase shift means is a resistive-capacitive means, and wherein said second resistive-reactive phase shift means is a resistive-inductive means.

4. In combination, a first parametron tuned to resonate at a frequency $f$; a second parametron tuned to resonate at said frequency $f$; resistive-capacitive phase shift means providing a signal phase shift in one sense coupling said first and second parametrons together, the serial resistance of said means having a value R, the serial capacitive reactance $|X_C|$ at said frequency $f$ having said value R; a third parametron tuned to resonate at said frequency $f$; and resistive-inductive phase shift means providing a signal phase shift in an opposite sense coupling said second and third parametrons together, the serial resistance of said resistive-inductive means having said value R, the serial inductive reactance $|X_L|$ at said frequency $f$ having said value R.

5. In combination, a first parametron tuned to resonate at a frequency $f$; a second parametron tuned to resonate at said frequency $f$; a third parametron tuned to resonate at said frequency $f$; resistive-inductive phase shift means providing a signal phase shift in one sense coupling said first and second parametrons together, the serial resistance of said means having the value R, the serial inductive reactance $X_L$ at said frequency $f$ having the value $X_L$; and resistive-capacitive phase shift means providing a signal phase shift in an opposite sense coupling said second and third parametrons together, the serial inductive reactance $X_L$ at said frequency $f$ having value R, the serial capacitive reactance at said frequency $f$ having the value $X_C$.

6. The combination as claimed in claim 5 wherein $|X_L|=|X_C|$.

7. The combination as claimed in claim 5 wherein $|X_L|=|X_C|=R$.

8. In combination, a first plurality of parametrons, each being tuned to resonate at a frequency $f$; a second plurality of parametrons, each being tuned to resonate at said frequency $f$; a plurality of resistive-inductive phase shift means providing a signal phase shift in one sense, each having a serial resistance R and a serial inductive reactance $X_L$ at said frequency $f$, for coupling a parametron from said first plurality to a parametron of said second plurality; and a plurality of resistive-capacitive phase shift means providing a signal phase shift in an opposite sense, each having a serial resistance R and a serial capacitive reactance $X_C$ at said frequency $f$, for coupling a parametron from said second plurality of parametrons to a parametron of said first plurality.

9. The combination as claimed in claim 8 wherein $|X_L|=|X_C|$.

10. The combination as claimed in claim 8 wherein $|X_L|=|X_C|=R$.

11. The combination as claimed in claim 8 further including means for applying a first clocked pump current to said first plurality of parametrons whereby each of said first plurality of parametrons oscillates in a stable manner at said frequency of $f$ at a reference phase 0 or at phase $\pi$; and means for applying a second clocked pump current to said second plurality of parametrons whereby each of said second plurality of parametrons oscillates in a stable manner at said frequency $f$ at a phase $\frac{1}{4}\pi$ or at a phase $5\pi/4$, with respect to said reference phase.

12. The combination as claimed in claim 11 wherein said first and second clocked pump current are each at the frequency $2f$ and at a phase $\pi/2$ with respect to each other.

13. In combination, a first LC tuned circuit resonant at a frequency $f$;

a second LC tuned circuit resonant at said frequency $f$;

a resistive-reactive means coupling said first circuit to said second circuit, the serial resistance of said means having a value R, the serial reactance of said means having a value X;

means for varying one of the parameters of said first LC tuned circuit at a frequency $2f$ at a reference phase 0; and means for varying one of the parameters of said second tuned circuit at said frequency $2f$ at a phase angle, with respect to said reference phase which is twice the angle whose tangent is $X/R$.

14. A shift register comprising, a first parametron having a tuned circuit resonant at a frequency $f$;

a second parametron having a tuned circuit resonant at said frequency $f$;

a third parametron having a tuned circuit resonant at said frequency $f$;

a fourth parametron having a tuned circuit resonant at said frequency $f$;

a first resistive-inductive means coupling said first and second parametrons together, the absolute value of the serial inductive reactance $|X_L|_1$ being equal to its serial resistance $R_1$;

a second resistive-capacitive means coupling said second and third parametrons together, the absolute value of the serial capacitive reactance $|X_C|_2$ being equal to its serial resistance $R_2$;

a third resistive-inductive means coupling said third and fourth parametrons together, the absolute value of the serial inductive reactance $|X_L|_3$ being equal to $R_3$;

a first means for receiving a clocked pump current having a frequency $2f$ at a fixed reference phase and having a duty cycle in excess of 50%;

a second means for receiving a clocked pump current having said frequency $2f$ and lagging said fixed phase by a phase $\pi/2$ (at the frequency $2f$) and having a duty cycle in excess of 50%, and wherein pump current is received at said first and/or second means at at a 100% duty cycle;

means coupling said first means to said first and third parametrons; and means coupling said second means to said second and fourth parametrons.

15. In combination, a first magnetic wire;

a first winding wound about said first wire, and first shunt capacitive means associated with said first winding to form a first tuned circuit resonant at a frequency $f$;

a second winding wound about said first wire, and second shunt capacitive means associated with said second winding to form a second tuned circuit resonant at said frequency $f$;

a third winding wound about said first wire, and third shunt capacitive means associated with said third winding to form a third tuned circuit resonant at said frequency $f$;

a second magnetic wire;

a fourth winding wound about said second wire, and fourth shunt capacitive means associated with said fourth winding to form a fourth tuned circuit resonant at said frequency $f$;

a fifth winding wound about said second wire, and fifth shunt capacitive means associated with said fifth winding to form a fifth tuned circuit resonant at said frequency $f$;

a first resistive-inductive means coupling said first tuned circuit to said fourth tuned circuit, and having a serial resistance $R_1$ and serial reactance (at said frequency $f$) $X_{L-1}$;

a second resistive-inductive means coupling said second tuned circuit to said fifth tuned circuit, and having a serial resistance $R_3$ and serial reactance (at said frequency $f$) $X_{L-3}$;

a first resistive capacitive means coupling said fourth tuned circuit to said second tuned circuit, and having a serial resistance $R_2$ and serial reactance (at said frequency $f$) $X_{C-2}$; and a second resistive-capacitive means coupling said fifth tuned circuit to said third tuned circuit, and having a serial resistance $R_4$ and serial reactance (at said frequency $f$) $X_{C-4}$; and wherein $$\frac{|X_{L-1}|}{R_1}=\frac{|X_{C-2}|}{R_2}=\frac{|X_{L-3}|}{R_3}=\frac{|X_{C-4}|}{R_4}$$

16. In combination, a first wire coated with a magnetic film;

a first winding wound about said first wire and capacitive means associated therewith to form a first circuit resonant at a frequency $f$;

a second winding wound about said first wire and capacitive means associated therewith to form a second circuit resonant at said frequency $f$;

a third circuit wound about said first wire and capacitive means associated therewith to form a third circuit resonant at said frequency $f$;

a second fire coated with a magnetic film;

a fourth winding wound about said second wire and capacitive means associated therewith to form a fourth circuit resonant at said frequency $f$;

a fifth winding wound about said second wire and capacitive means associated therewith to form a fifth circuit resonant at said frequency $f$;

a first impedance means coupling said first circuit to said fourth circuit, and having an effective serial resistance $R_1$ and, at said frequency $f$, having an effective serial reactance $X_{L-1}$;

a second impedance means coupling said fourth circuit to said second circuit, and having an effective serial resistance $R_2$ and, at said frequency $f$, having an effective serial reactance $X_{C-2}$;

a third impedance means coupling said second circuit to said fifth circuit, and having an effective serial resistance $R_3$ and, at said frequency $f$, having an effective serial reactance $X_{L-3}$;

a fourth impedance means coupling said fifth circuit to said third circuit, and having an effective serial resistance $R_4$ and, at said frequency $f$, having an effective serial reactance $X_{C-4}$;

a first receiving means for receiving a clocked pump current having a frequency $2f$ at a fixed reference phase and having a duty cycle in excess of 50%;

a second receiving means for receiving a clocked pump current having said frequency $2f$ and lagging said fixed phase by an angle $2\alpha$ (at the frequency $2f$) and having a duty cycle in excess of 50%, and wherein pump current is received at a 100% duty cycle at either or both said first and second receiving means;

means coupling said first receiving means to said first wire; and means coupling said second receiving means to said second wire.

17. The combination as claimed in claim 16 wherein, $$\frac{|X_{L-1}|}{R_1}=\frac{|X_{C-2}|}{R_2}=\frac{|X_{L-3}|}{R_3}=\frac{|X_{C-4}|}{R_4}=\tan\alpha$$

18. The combination as claimed in claim 17 wherein $\alpha=\pi/4$.

References Cited

UNITED STATES PATENTS

| | | | |
|---|---|---|---|
| 3,051,843 | 8/1962 | Eiichi Goto | 307—88 |
| 2,957,087 | 10/1960 | Eiichi Goto | 307—88 |

JAMES W. MOFFITT, *Primary Examiner.*